United States Patent
Qi et al.

(10) Patent No.: US 10,494,976 B2
(45) Date of Patent: Dec. 3, 2019

(54) EXHAUST AFTERTREATMENT SYSTEM AND DOC NO2 GENERATION ON-BOARD DIAGNOSTICS METHOD

(71) Applicant: GM Global Technology Operations LLC, Detroit, MI (US)

(72) Inventors: Gongshin Qi, Troy, MI (US); Michelle H. Wiebenga, Farmington Hills, MI (US); Wei Li, Troy, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 55 days.

(21) Appl. No.: 15/881,101

(22) Filed: Jan. 26, 2018

(65) Prior Publication Data
US 2019/0234278 A1    Aug. 1, 2019

(51) Int. Cl.
| F01N 11/00 | (2006.01) |
| F01N 3/20 | (2006.01) |
| F01N 3/10 | (2006.01) |
| B01D 53/94 | (2006.01) |
| B01J 23/745 | (2006.01) |

(52) U.S. Cl.
CPC ........... *F01N 11/00* (2013.01); *B01D 53/944* (2013.01); *B01D 53/9418* (2013.01); *B01D 53/9477* (2013.01); *B01D 53/9495* (2013.01); *B01J 23/745* (2013.01); *F01N 3/106* (2013.01); *F01N 3/2066* (2013.01); *B01D 2255/20738* (2013.01); *B01D 2255/20761* (2013.01); *F01N 2370/02* (2013.01); *F01N 2560/026* (2013.01); *F01N 2570/14* (2013.01); *F01N 2610/02* (2013.01)

(58) Field of Classification Search
CPC ........ F01N 11/00; F01N 3/106; F01N 3/2066; F01N 2370/02; F01N 2560/026; F01N 2570/14; F01N 2610/02; B01D 53/9418; B01D 53/944; B01D 53/9477; B01D 53/9495; B01D 2255/20738; B01D 2255/20761; B01J 23/745
See application file for complete search history.

(56) References Cited

U.S. PATENT DOCUMENTS

| 8,720,189 | B2 | 5/2014 | Ren et al. | |
| 9,708,953 | B1* | 7/2017 | Szailer | F01N 3/2066 |
| 2009/0266063 | A1* | 10/2009 | Gandhi | B01D 53/9418 60/301 |
| 2014/0341781 | A1* | 11/2014 | Nagaoka | F02D 41/029 422/111 |
| 2016/0097312 | A1* | 4/2016 | Nilsson | F01N 3/22 60/274 |

* cited by examiner

Primary Examiner — Brandon D Lee

(57) ABSTRACT

A method for exhaust aftertreatment includes determining a diagnostic condition with respect to a threshold diagnostic condition, determining an SCR efficiency as a ratio of a readout of a first NOx sensor at a first NOx sensing position with respect to a readout of a second NOx sensor at a second NOx sensing position, the first NOx sensing position located about an engine out area within an exhaust stream before a DOC and the second NOx sensing position located about an output of an SCR device within the exhaust stream; and comparing the SCR efficiency to a threshold SCR efficiency range. If the SCR efficiency is less than the threshold SCR efficiency range, then trigger DOC failure for NO oxidation, and if the SCR efficiency is greater than or equal to the threshold SCR efficiency range, then DOC is determined to be operating within specifications.

18 Claims, 2 Drawing Sheets

EXHAUST AFTERTREATMENT SYSTEM AND DOC NO2 GENERATION ON-BOARD DIAGNOSTICS METHOD

INTRODUCTION

The present disclosure relates to an engine exhaust aftertreatment system for use in a vehicle, and more particularly to a diagnostic system with NO2 generation detection.

Significant interest has been focused on the reduction of certain constituents in internal combustion engine exhaust. Recently, focus has been placed on diesel engines. Diesel engine exhaust typically contains gaseous emissions such as unburned hydrocarbons ("HC"), carbon monoxide ("CO"), and oxides of nitrogen ("NOx") including NO and NO2, along with solid and/or liquid condensed phase materials referred to as particulates. Treatment of diesel engine exhaust may involve various catalytic devices having one or more catalysts disposed on a substrate for reducing the levels of regulated constituents in the diesel exhaust. For example, diesel exhaust treatment systems may include an oxidation catalyst, also known as a diesel oxidation catalyst ("DOC"), to convert HC and CO to CO2 and water, a catalyst for the reduction of NOx, and a particulate filter, also known as a diesel particulate filter ("DPF"), for removal of particulates.

One diesel exhaust treatment technology of particular interest is the use of a selective catalytic reduction ("SCR") catalyst for the reduction of NOx. This technology involves the catalytically-enhanced reduction of NO to nitrogen and water by ammonia or an ammonia source such as urea. The efficiency of this reduction reaction is significantly impacted by the ratio of NO2:NOx in the exhaust stream entering the SCR catalyst. The impact of this ratio on SCR efficiency is especially pronounced at lower operating temperatures (e.g., <300° C.). For a typical zeolite-based SCR catalyst, the desired NO2:NOx ratio is about 0.5, which is required for a fast SCR reaction. Exhaust coming out of an engine, however, often exhibits a less than ideal NO2:NOx ratio of less than 0.2. Fortunately, a diesel oxidation catalyst (DOC) device, which is often placed upstream of an SCR catalyst in diesel exhaust treatment systems, is capable of converting NO to NO2 so that the ratio of NO2:NOx in the exhaust stream entering the SCR reactor can more closely approach the desired ratio.

In the field, known versions of copper (Cu) based SCR catalysts have performed better in some respects including having less sensitivity to NO2 in the exhaust feed with higher NOx conversion at low temperatures. Iron (Fe) based SCR catalysts can be improved with management of the supply of NO2 in the exhaust feed. Further, Fe-SCR devices are more sensitive to NO2 in the feed. In vehicles, it is desired to trigger the OBDII System (on-board diagnostics) upon DOC and SCR system degradation beyond a certain point. As such, there is a need for monitoring the effectiveness of the exhaust system and alerting a user upon reaching a threshold condition for triggering remediation to avoid the more severe effects of exhaust component failures that would otherwise cause environmental contamination and regulatory noncompliance.

SUMMARY

According to an aspect of the present disclosure a method for exhaust aftertreatment includes determining a diagnostic condition with respect to a threshold diagnostic condition, determining a selective catalytic reduction (SCR) efficiency as a ratio of a readout of a first NOx sensor at a first NOx sensing position with respect to a readout of a second NOx sensor at a second NOx sensing position, the first NOx sensing position located about an engine out area within an exhaust stream before a diesel oxidation catalyst (DOC) and the second NOx sensing position located about an output of an SCR device within the exhaust stream; and comparing the SCR efficiency to a threshold SCR efficiency range. If the SCR efficiency is less than the threshold SCR efficiency range, then triggering a DOC failure notification for out of range NO oxidation; and if the SCR efficiency is greater than or equal to the threshold SCR efficiency range, then DOC is determined to be operating within specifications.

In another aspect of the present disclosure the diagnostic condition includes a range of values for an ammonia loading level, a temperature, and an exhaust flow rate, and a ratio of Iron (Fe) to Copper (Cu) in the SCR ranges from about 1:1 to about 1:10.

In yet another aspect of the present disclosure the range of values for the ammonia loading level is from about from about 0.1 to about 5.0 g/L-catalyst.

In yet another aspect of the present disclosure the range of values for the temperature is from about 150° Celsius to about 450° Celsius.

In yet another aspect of the present disclosure the range of values for the exhaust flow rate is from about 5 to about 60 g/s.

In yet another aspect of the present disclosure the range of values for the ammonia loading level is from about from about 0.2 to about 3.0 g/L-catalyst.

In yet another aspect of the present disclosure the range of values for the temperature is from about 175° Celsius to about 350° Celsius.

In yet another aspect of the present disclosure the range of values for the exhaust flow rate is from about 10 to about 50 g/s.

In yet another aspect of the present disclosure the range of values for the ammonia loading level is from about from about 0.3 to about 1.0 g/L-catalyst.

In yet another aspect of the present disclosure the range of values for the temperature is from about 200° Celsius to about 300° Celsius.

In yet another aspect of the present disclosure the range of values for the exhaust flow rate is from about 20 to about 40 g/s.

In yet another aspect of the present disclosure a method for exhaust aftertreatment includes determining a diagnostic condition with respect to a threshold diagnostic condition, the diagnostic condition including a range of values for an ammonia loading level, a temperature, and an exhaust flow rate, determining an SCR efficiency as a ratio of a readout of a first NOx sensor at a first NOx sensing position with respect to a readout of a second NOx sensor at a second NOx sensing position, the first NOx sensing position located about an engine out area within an exhaust stream before a DOC and the second NOx sensing position located about an output of an SCR device within the exhaust stream, and comparing the SCR efficiency to a threshold SCR efficiency range. If the SCR efficiency is less than the threshold SCR efficiency range, then triggering a DOC failure notification for out of range NO oxidation, and if the SCR efficiency is greater than or equal to the threshold SCR efficiency range, then DOC is determined to be operating within specifications, and a ratio of Iron (Fe) to Copper (Cu) in the SCR ranges from about 1:1 to about 1:10.

In yet another aspect of the present disclosure the range of values for the ammonia loading level is from about from about 0.1 to about 5.0 g/L-catalyst, the range of values for the temperature is from about 150° Celsius to about 450° Celsius, and the range of values for the exhaust flow rates is from about 5 g/s to about 60 g/s.

In yet another aspect of the present disclosure the range of values for the ammonia loading level is from about from about 0.2 to about 3.0 g/L-catalyst.

In yet another aspect of the present disclosure the range of values for the temperature is from about 175° Celsius to about 350° Celsius.

In yet another aspect of the present disclosure the range of values for the exhaust flow rate is from about 10 to about 50 g/s.

In yet another aspect of the present disclosure the range of values for the ammonia loading level is from about from about 0.3 to about 1.0 g/L-catalyst.

In yet another aspect of the present disclosure the range of values for the temperature is from about 200° Celsius to about 300° Celsius.

In yet another aspect of the present disclosure the range of values for the exhaust flow rate is from about 20 to about 40 g/s.

In yet another aspect of the present disclosure a method for exhaust aftertreatment includes determining a diagnostic condition with respect to a threshold diagnostic condition, the diagnostic condition including an ammonia loading level between about 0.3 to about 1.0 g/L-catalyst, a temperature between about 200° Celsius and about 300° Celsius, and an exhaust flow rate from about 20 g/s to about 40 g/s. The method further includes determining an SCR efficiency as a ratio of a readout of a first NOx sensor at a first NOx sensing position with respect to a readout of a second NOx sensor at a second NOx sensing position, the first NOx sensing position located about an engine out area within an exhaust stream before a DOC and the second NOx sensing position located about an output of an SCR device within the exhaust stream, and comparing the SCR efficiency to a threshold SCR efficiency range. If the SCR efficiency is less than the threshold SCR efficiency range, then triggering a DOC failure notification for out of range NO oxidation, and if the SCR efficiency is greater than or equal to the threshold SCR efficiency range, then DOC is determined to be operating within specifications, and a ratio of Iron (Fe) to Copper (Cu) in the SCR ranges from about 1:1 to about 1:10.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
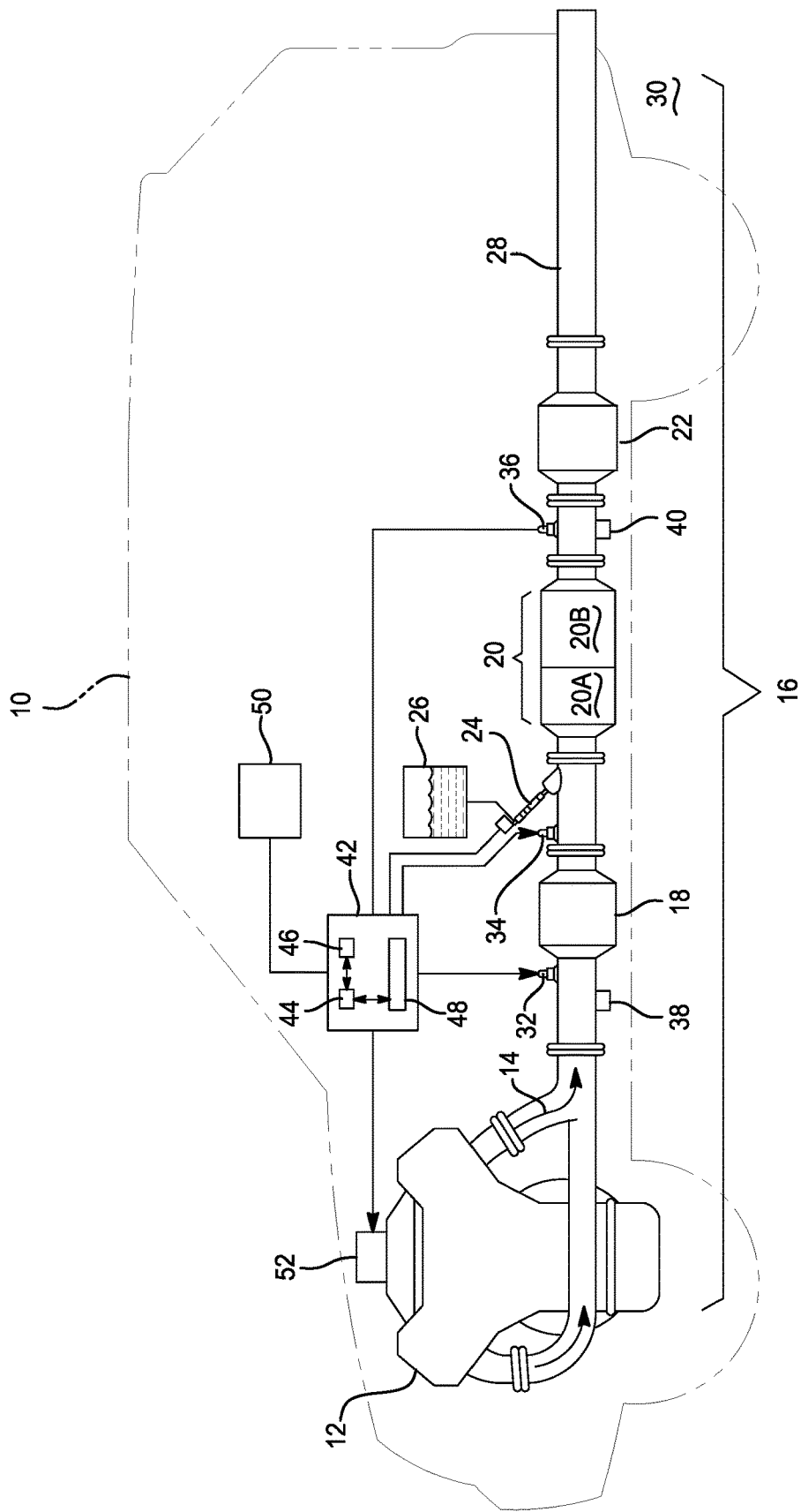
FIG. 1 is a schematic illustration of a vehicle according to an exemplary embodiment.

Referring now to the drawings, wherein like reference numbers correspond to like or similar components throughout the several figures, a vehicle 10 is shown schematically in FIG. 1. While the vehicle 10 is illustrated as a sport utility vehicle, it should be appreciated that the vehicle 10 may be any type of vehicle including a car, van, truck, motor home, etc. The vehicle 10 generally includes a prime mover or engine 12. The engine 12 is configured to provide power to the vehicle 10 by combustion of supplied fuel and air within at least one combustion chamber (not specifically shown). The result of combustion provides a stream of exhaust 14 including various exhaust constituent products. Over time, certain exhaust constituents have been recognized as having harmful or detrimental effects on health and/or the environment. Four such potentially harmful or detrimental exhaust constituents resulting from air/fuel combustion within the engine 12 are carbon monoxide (CO), oxides of nitrogen (NOx), unburned hydrocarbons (HC), and particulate matter. To reduce the potential for harmful exhaust emissions entering the atmosphere, the stream of exhaust 14 is directed through an exhaust aftertreatment system 16 before exiting the vehicle 10 into the environment.

In the example depicted in FIG. 1, the exhaust aftertreatment system 16 includes a diesel oxidation catalyst (DOC) 18, a selective catalytic reduction catalyst (SCR) 20 and a diesel particulate filter (DPF) 22. The exhaust aftertreatment system 16 treats the exhaust 14 to remove the CO, the NOx, the HC, and the particulates. After being produced by the engine 12, the stream of exhaust 14 first passes through the DOC 18. The DOC 18 oxidizes the CO into carbon dioxide (CO2) and oxidizes the HC into CO2 and water (H2O). In addition, nitric oxide (NO) is oxidized into nitrogen dioxide (NO2) in the DOC 18. Thus, CO, NO, and HC are converted into CO2, H2O, NO2, and NO in the DOC 18 and are sent on to the SCR 20 in the stream of exhaust 14.

In diesel engines, after the exhaust 14 leaves the DOC 18, the exhaust 14 is injected with urea, or ammonia (NH3), using a urea injector 24. The urea injector 24 is supplied with a urea solution stored in a urea tank 26. The exhaust 14 mixed with the urea enters the SCR 20. In some examples, the SCR 20 includes a two part substrate composed of an Fe-based SCR 20A serially preceding a Cu-based SCR 20B. It should be understood that while the SCR 20 is described herein as including a two-part substrate having Fe-based and Cu-based SCR substrates 20A, 20B, oriented serially relative to the stream of exhaust 14, other configurations may also be used depending on a given application and diagnostic goals for the given application. Thus, while in FIG. 1, both Fe- and Cu-based SCR substrates 20A, 20B are shown, in some applications only an Fe-based SCR 20A, or only a Cu-based SCR 20B may be used, depending on the exhaust 14 constituent requirements of a given vehicle 10 or regulation. In an example of a two-equal part substrate as described hereinabove, the ratio of Fe to Cu can vary from about 1:1 to about 1:10. In general, the SCR 20 receives exhaust 14 from the DOC 18 and performs reduction reactions on NOx exhaust 14 constituents, thereby creating fewer harmful tailpipe 28 emissions for a given engine 12. In other words, the SCR 20 converts or reduces NOx exhaust 14 constituents to nitrogen (N2) and water (H2O). More specifically, NO reacts with NH3, and O2 to produce N2 and H2O within the SCR 20 in what is known as a "standard"

SCR reaction. In addition, NO+NO2 react with NH3 to produce N2 and H2O in what is known as a "fast" SCR reaction.

Having passed through the DOC 18 and the SCR 20, the exhaust 14 enters the DPF 22. The DPF 22 is designed to remove diesel particulate matter or soot from the exhaust gas of a diesel engine. After passing through the DPF 22, the exhaust 14, substantially cleaned of CO, HC, NOx, and particulates by the DOC 18, SCR 20, and DPF 22, respectively, enters the tailpipe 28 before exiting the vehicle 10 to the environment 30.

In addition to the DOC 18, SCR 20, and DPF 22, the exhaust aftertreatment system 16 includes a plurality of sensors, including a first temperature sensor 32 upstream of the DOC 18, a second temperature sensor 34 between the DOC 18 and the SCR 20, and a third temperature sensor 36 just downstream of the SCR 20. Additionally, the exhaust aftertreatment system 16 has a first NOx sensor 38 upstream from the DOC 18 and a second NOx sensor 40 downstream from the SCR 20.

The exhaust aftertreatment system 16 sensors 32, 34, 36, 38, 40, are in communication with a control module 42 that is a non-generalized, electronic control device having a preprogrammed digital computer or processor 44, memory or non-transitory computer readable medium 46 used to store data such as control logic, instructions, image data, lookup tables, etc., and a plurality of input/output peripherals or ports 48. The processor 44 is configured to execute the control logic or instructions. The control module 42 may have additional processors 44 or additional integrated circuits in communication with the processor 44. The control module 42 can output to a display 50, such as an instrument cluster visible to a vehicle occupant. The control module 42 can also communicate with other vehicle systems, such as an engine controller 52.

Figure 2:
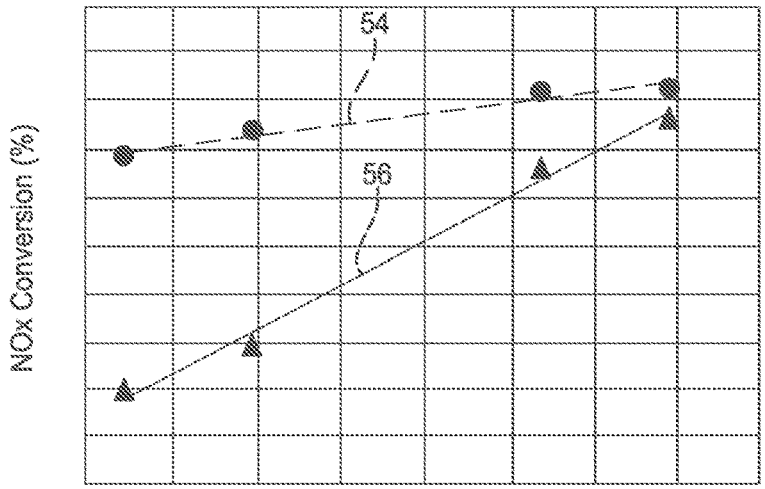
FIG. 2 is a graph indicating a relationship between NOx conversion and NO2 fraction in the exhaust before entering a Cu-SCR and before entering a Cu-SCR+Fe-SCR according to an exemplary embodiment.

Turning now to FIG. 2, and with continuing reference to FIG. 1, a graph shows a NOx conversion efficiency plotted with respect to NO2 fraction in the exhaust 14 before entering into the SCR 20. More specifically, the graph shows NOx conversion efficiency of a Cu-SCR, such as Cu-based SCR 20B, and a NOx conversion efficiency of an Fe-based SCR 20A combined with a Cu-SCR 20B (the Fe-based SCRs 20A and Cu-based SCRs 20B hereinafter referred to when combined into a single unit as SCR 20—as shown in FIG. 1) plotted with respect to NO2 fraction in the exhaust 14 before entering into the SCR 20. The NOx conversion percentage refers to the NOx in the exhaust before SCR 20 versus the NOx in the exhaust after the SCR 20. In the graph of FIG. 2, a first trace 54 of an SCR 20 having only a Cu-SCR component shows that the NOx conversion of the Cu-SCR is more efficient at lower NO2 fractions compared to a second trace 56 of the NOx conversion efficiency of the SCR 20, including both an Fe-SCR 20A and a CU-SCR 20B combined into a single SCR 20 unit. That is, the Cu-SCR converts a higher percentage of NOx at lower NO2 fraction in the exhaust as compared to the SCR 20 having both Fe-SCR 20A and Cu-SCR components 20B. However, because there is a significant disparity between the NOx conversion efficiency of the SCR 20A+20B at low NO2 fractions versus at high NO2 fractions, the NOx conversion efficiency of the SCR 20A+20B facilitates reliability and granularity of a diagnostic discussed herein to robustly indicate whether there is an oxidation failure in the DOC 18. In other words, engine-out NOx levels measured by the first NOx sensor 38 are compared to SCR-out NOx levels measured by the second NOx sensor 40. A ratio of the SCR-out NOx levels to the engine-out NOx levels is computed and compared to a predetermined set of values. Based on the comparison above, a health status of the DOC 18 can be ascertained.

More specifically, the efficiency of NOx reduction in the exhaust 14 is a function of the ratio of NO2 to NOx in the stream of exhaust 14 entering the SCR 20, especially at a lower end of the operating temperature range, for example, at temperatures under 300 deg. C. The DOC 18 adjusts the ratio of NO2 to NOx under typical operating conditions from about 0.1 to preferably about 0.5 for typical zeolite SCR 20 devices.

Proper DOC 18 functionality provides a balance of feed-gas constituents for proper SCR 20 operation. Thus, NO2 production occurring in the DOC 18 supports NOx reduction in the SCR 20. A strong linear correlation between SCR 20A+20B efficiency and NO2 fraction allows measurement of the functionality and efficiency of the DOC 18.

Figure 3:
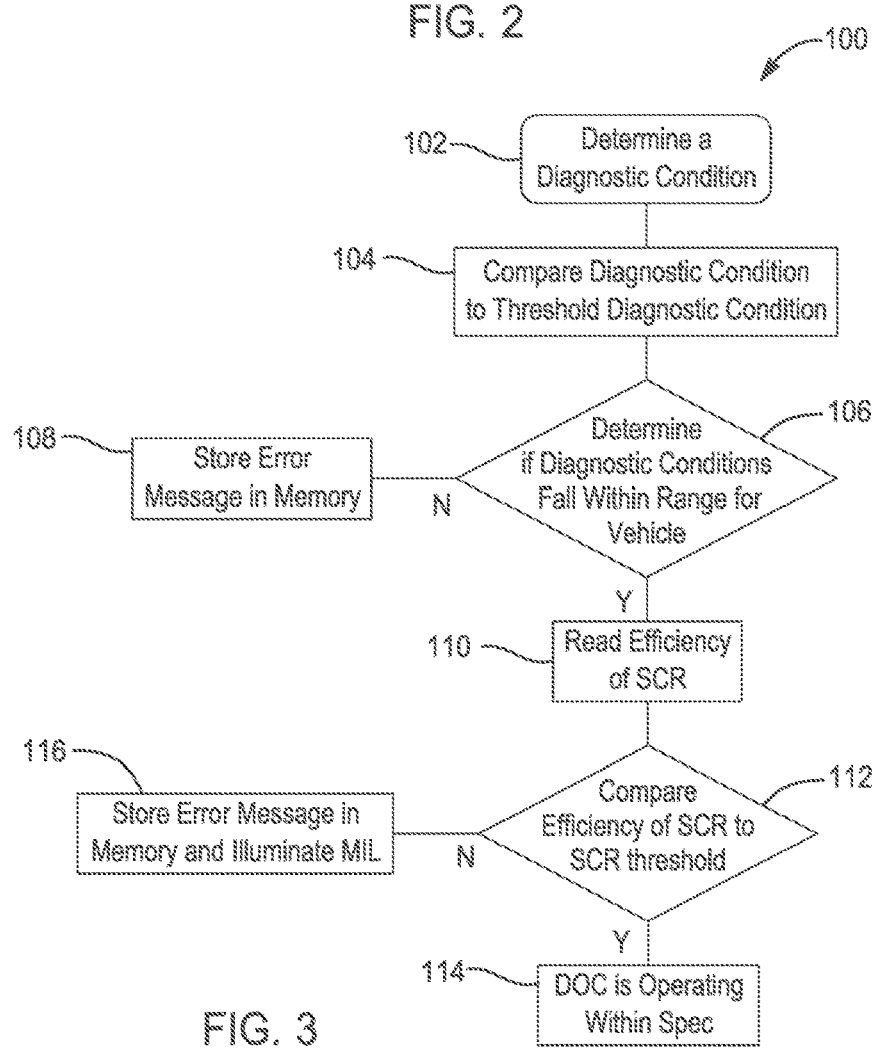
FIG. 3 is a flowchart depicting an algorithm for determining SCR efficiency as a check for oxidation of oxides of nitrogen within a DOC according to an exemplary embodiment.

Now referring to FIG. 3, a method for exhaust aftertreatment is shown and is indicated generally by reference number 100. Generally, the exhaust aftertreatment method 100 determines the operating efficiency of the exhaust aftertreatment system 16 and generates a notification for the operator of the vehicle 10 under certain conditions. In some aspects, the notification is displayed as a malfunction indicator light (MIL) or check engine light (CEL) on the display 50. The method 100 begins at step 102 where the control module 42 determines a diagnostic condition of the exhaust aftertreatment system 16. In several aspects, the diagnostic conditions are ammonia loading level of the SCR 20, exhaust gas temperature, and exhaust flow rate. Temperatures are measured by the first temperature sensor 32 located substantially at an engine out location proximate the engine 12 and upstream from the DOC 18 in the stream of exhaust 14. In some examples, exhaust gas temperatures are also measured by the second temperature sensor 34. In one aspect, the exhaust flow rate is calculated, for example, using a known engine mass air flow balance with a known volume of air and fuel supplied to the combustion chambers of the engine 12.

At step 104 the control module 42 compares the diagnostic conditions determined at step 102 to threshold diagnostic conditions. The threshold diagnostic conditions include an ammonia loading range, a temperature range, and an exhaust flow rate range. In one example, the ammonia loading range is from about 0.1 to about 5.0 g/L-catalyst in a first range where a variance of ±0.05 g/L-catalyst is acceptable. In a second example, the ammonia loading range is from about 0.2 to about 3.0 g/L-catalyst. In a third example, the ammonia loading range is from about 0.3 to about 1.0 g/L-catalyst. In one example, the temperature range is from about 150 to about 450 degrees Celsius in a first range, where a where a variance of ±10 degrees Celsius is acceptable. In a second example, the temperature range is from about 175 to about 350 degrees Celsius. In a third example, the temperature range is from about 200 to about 300 degrees Celsius. In one example, the exhaust flow rate range is from about 5 to about 60 g/s where a variance of ±0.5 g/s is acceptable. In a second example, the exhaust flow rate range is from about 10 to about 50 g/s. In a third example, the exhaust flow rate range is from about 20 to about 40 g/s. The ammonia loading ranges, temperatures ranges and exhaust flow rate ranges are selected and adjusted according to vehicle criteria and regulatory requirements for a given vehicle 10. At step 106, the control module 42 determines whether each of the diagnostic conditions fall within each of the ranges for the given vehicle 10. If any of the diagnostic conditions do not fall within a respective range for the given vehicle 10, then the method 100 proceeds to step 108 where the control module 42 stores an error message in memory 46 and notifies the vehicle operator by way of illuminating a MIL on the display 50. Thereinafter, the method 100 terminates at step 108. However, depending on vehicle requirements, the method 100 can restart at step 102 after a predetermined time period during which the diagnostic conditions fall within acceptable specifications.

If, however, the diagnostic conditions each fall within the respective ranges for the given vehicle 10, then the method 100 proceeds to step 110 where the control module 42 reads the efficiency of the SCR 20. The SCR efficiency can be expressed as a ratio of NOx sensed by the first NOx sensor 38 to the NOx sensed by the second NOx sensor 40.

At step 112 the control module 42 compares the efficiency of the SCR 20 determined at step 110 to an SCR threshold. The SCR threshold can be read from a lookup table or designed into the vehicle 10 as a reference value. If the efficiency of the SCR 20 is greater than the SCR threshold, then the method proceeds to step 114 and the DOC 18 is determined to be operating within acceptable specifications and the amount of NO oxidation is acceptable. If, however, the efficiency of the SCR 20 is less than the SCR threshold, then the method 100 proceeds to step 116 and where the DOC 18 is flagged for a failing to oxidize NO with sufficient efficiency. At step 116, the control module 42 stores an error message in memory 46 and notifies the vehicle operator by way of illuminating a MIL on the display 50. Thereinafter, the method 100 terminates at step 116. However, depending on vehicle 10 requirements, the method 100 can restart at step 102 after a predetermined time period during which the efficiency of the SCR 20 is within acceptable specifications.

Additionally, while this exemplary algorithm relates to exhaust aftertreatment in a vehicle 10, it is to be understood that the exhaust aftertreatment system discussed herein can be applied to various types of prime movers, whether mobile or stationary. For example, a construction site may operate with various stationary generators active at one time. Any combustible system with exhaust gas constituents similar in nature to those discussed herein may be adapted to utilize one or more of the systems and methods described herein as adaptable by one of skill in the art.

Additionally, where Fe-SCR+Cu-SCR is indicated throughout this disclosure, it should be understood that other variations can be utilized including an Fe-SCR 20A only option, a Cu-SCR 20B only option, a Cu-SCRF (combination DPF and SCR), and an Fe-SCRF.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for exhaust aftertreatment, comprising:
   determining a diagnostic condition with respect to a threshold diagnostic condition, the diagnostic condition including a range of values for an ammonia loading level, a temperature, and an exhaust flow rate;
   determining a selective catalytic reduction catalyst (SCR) efficiency as a ratio of a readout of a first nitrogen oxides (NOx) sensor at a first NOx sensing position with respect to a readout of a second NOx sensor at a second NOx sensing position, the first NOx sensing position located about an engine out area within an exhaust stream before a diesel oxidation catalyst (DOC) and the second NOx sensing position located about an output of an SCR device within the exhaust stream;
   measuring the temperature with a first temperature sensor upstream of the DOC, with a second temperature sensor between the DOC and the SCR, and with a third temperature sensor downstream of the SCR; and
   comparing the SCR efficiency to a threshold SCR efficiency range;
   wherein when the SCR efficiency is less than the threshold SCR efficiency range, then triggering a DOC failure notification for out of range NO oxidation;
   wherein when the SCR efficiency is greater than or equal to the threshold SCR efficiency range, then DOC is determined to be operating within specifications,
   wherein a ratio of Iron (Fe) to Copper (Cu) in the SCR ranges from about 1:1 to about 1:10, and
   wherein the range of values for the ammonia loading level is from about 0.1 to about 5.0 g/L-catalyst.

2. The method of claim 1, wherein the range of values for the temperature is from about 150° Celsius to about 450° Celsius.

3. The method of claim 1, wherein the range of values for the exhaust flow rate is from about 5 to about 60 g/s.

4. The method of claim 1, wherein the range of values for the ammonia loading level is from about 0.2 to about 3.0 g/L-catalyst.

5. The method of claim 1, wherein the range of values for the temperature is from about 175° Celsius to about 350° Celsius.

6. The method of claim 1, wherein the range of values for the exhaust flow rate is from about 10 to about 50 g/s.

7. The method of claim 1, wherein the range of values for the ammonia loading level is from about 0.3 to about 1.0 g/L-catalyst.

8. The method of claim 1, wherein the range of values for the temperature is from about 200° Celsius to about 300° Celsius.

9. The method of claim 1, wherein the range of values for the exhaust flow rate is from about 20 to about 40 g/s.

10. A method for exhaust aftertreatment, comprising:
    determining a diagnostic condition with respect to a threshold diagnostic condition, the diagnostic condition including a range of values for an ammonia loading level, a temperature, and an exhaust flow rate;
    determining an selective catalytic reduction catalyst (SCR) efficiency as a ratio of a readout of a first oxides of nitrogen (NOx) sensor at a first NOx sensing position with respect to a readout of a second NOx sensor at a second NOx sensing position, the first NOx sensing position located about an engine out area within an exhaust stream before a diesel oxidation catalyst (DOC) and the second NOx sensing position located about an output of an SCR device within the exhaust stream;
    measuring the temperature with a first temperature sensor upstream of the DOC, with a second temperature sensor between the DOC and the SCR, and with a third temperature sensor downstream of the SCR; and
    comparing the SCR efficiency to a threshold SCR efficiency range;
    wherein when the SCR efficiency is less than the threshold SCR efficiency range, then triggering a DOC failure notification for out of range NO oxidation;
    wherein when the SCR efficiency is greater than or equal to the threshold SCR efficiency range, then DOC is determined to be operating within specifications;

wherein a ratio of Iron (Fe) to Copper (Cu) in the SCR ranges from about 1:1 to about 1:10, and wherein the range of values for the ammonia loading level is from about 0.1 to about 5.0 g/L-catalyst.

11. The method of claim 10, wherein the range of values for the temperature is from about 1500 Celsius to about 450 Celsius, and the range of values for the exhaust flow rates is from about 5 g/s to about 60 g/s.

12. The method of claim 10, wherein the range of values for the ammonia loading level is from about 0.2 to about 3.0 g/L-catalyst.

13. The method of claim 10, wherein the range of values for the temperature is from about 175° Celsius to about 350° Celsius.

14. The method of claim 10, wherein the range of values for the exhaust flow rate is from about 10 to about 50 g/s.

15. The method of claim 10, wherein the range of values for the ammonia loading level is from about 0.3 to about 1.0 g/L-catalyst.

16. The method of claim 10, wherein the range of values for the temperature is from about 200° Celsius to about 300° Celsius.

17. The method of claim 10, wherein the range of values for the exhaust flow rate is from about 20 to about 40 g/s.

18. A method for exhaust aftertreatment, comprising:
   determining a diagnostic condition with respect to a threshold diagnostic condition, the diagnostic condition including an ammonia loading level between about 0.3 to about 1.0 g/L-catalyst, a temperature between about 200° Celsius and about 300° Celsius, and an exhaust flow rate from about 20 g/s to about 40 g/s;
   determining an SCR efficiency as a ratio of a readout of a first NOx sensor at a first NOx sensing position with respect to a readout of a second NOx sensor at a second NOx sensing position, the first NOx sensing position located about an engine out area within an exhaust stream before a DOC and the second NOx sensing position located about an output of an SCR device within the exhaust stream;
   measuring the temperature with a first temperature sensor upstream of the DOC, with a second temperature sensor between the DOC and the SCR, and with a third temperature sensor downstream of the SCR; and
   comparing the SCR efficiency to a threshold SCR efficiency range;
   wherein when the SCR efficiency is less than the threshold SCR efficiency range, then triggering a DOC failure notification for out of range NO oxidation;
   wherein when the SCR efficiency is greater than or equal to the threshold SCR efficiency range, then DOC is determined to be operating within specifications; and
   wherein a ratio of Iron (Fe) to Copper (Cu) in the SCR ranges from about 1:1 to about 1:10.

* * * * *